…

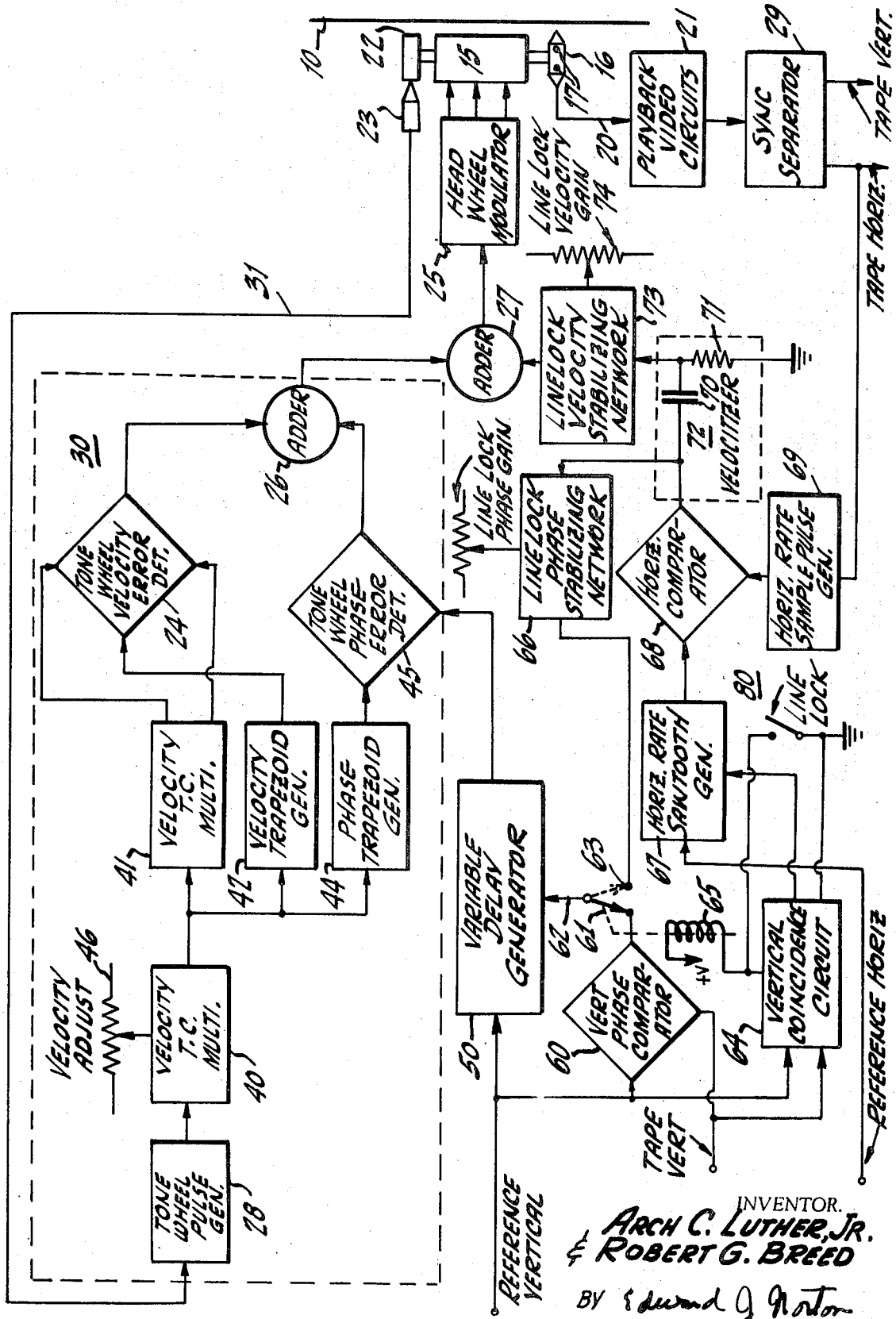

3,542,950
SERVO SYSTEM
Arch C. Luther, Jr., and Robert G. Breed, Cherry Hill, N.J., assignors to RCA Corporation, a corporation of Delaware
Filed Aug. 2, 1966, Ser. No. 569,611
Int. Cl. H04n 1/22, 1/36
U.S. Cl. 178—6.6          8 Claims

ABSTRACT OF THE DISCLOSURE

A compound servo system for controlling the operation of a headwheel in a recorder-reproducer system. Reference synchronizing signals are compared with tape synchronizing signals by a phase comparator. The output error signal is used to control the headwheel motor through a tone wheel servo. More particularly, the error signal controls a variable delay generator in the tone wheel servo's reference path. Simultaneously, the error signal is differentiated and this signal is fed directly into the headwheel amplitude modulator to further control the headwheel motor.

---

This invention relates to servo systems, and particularly to an improved servo system for use in conjunction with an amplitude modulated controlled motor to obtain accurate and improved synchronization. The invention is particularly suitable for use in television tape recorders and reproducers and is especially suitable for use in color television signal recording and reproducing apparatus.

In prior art television recorders of the quadruplex type, two systems are most commonly used to control the speed and phase of a headwheel motor. One system accomplishes headwheel control by a frequency and/or phase modulation scheme. In this system, the headwheel motor is run at a synchronous speed and is usually a conventional 3-phase type hysteresis synchronous motor. The frequency and/or phase modulation system uses an oscillator at a specific center frequency, for example, 240 cycles. The frequency of the oscillator is modulated about this center frequency, and the oscillator exhibits frequency changes which can be used to vary the speed of the motor. This is so because the output of the oscillator is usually coupled to two or three power amplifiers each of which drives one of the phases of the motor. In the frequency modulated system to obtain more accurate control of the instantaneous phase of the motor, the input to the power amplifiers or their outputs are further modulated. The combination, namely, the modulation of the oscillator, and the modulation of the inputs to or outputs of the power amplifiers give large bandwidth and consequently accurate control and result in a low jitter operation.

One of the disadvantages associated with frequency modulated and/or phase modulated systems is that the 3-phase synchronous motor requires full power at all times even under optimum running conditions of proper velocity and phase. Because of the high power requirements, the motor runs hot and the consequent increases in temperature cause disruptive changes in the headwheel assembly which is usually situated in the same vicinity as the headwheel motor. Such temperature effects cause picture distortion and are detrimental to proper recording and reproducing. Still another disadvantage is that the power supplied to each phase of the 3-phase motor from the power amplifiers must be identical for proper operation. It is well known in the state of the art that electrical circuits such as 3-phase amplifiers, modulators and such cannot be designed to be perfectly identical. Even if such identical signals could be produced it would be difficult to fabricate motors with identical inductance, capacitance and otherwise perfect balance in the respective windings. The imbalances described above cause distortion in the motor's rotating fields which in turn cause the rotor to exhibit eccentricities causing the headwheel to read back the signal from the tape with errors in timing. Still a further disadvantage is that the motor used is usually a hysteresis type motor and such motors are very susceptible to hunting. Typically these motors hunt at a frequency which may vary between several cycles per second. This hunting is generally controlled by the use of a servo loop compensating for the phenomenon. The gain and phase characteristics of such a loop are critical and have to be carefully adjusted. If the gain and phase is not set at proper levels, the loop becomes unstable and will cause the motor to become wobbly.

To avoid the difficulties experienced with the above described system, an amplitude modulated (A.M.) system is used. In such a system the motor is caused to run in a slip or induction mode. During this mode of operation just enough power is supplied to the motor to allow the motor to overcome friction and windage and maintain desired phase. Hence the power supplied is just enough for the motor to perform its function properly and drive the headwheel assembly at the required speed and phase. Due to this operation, there is slight heating of the motor and therefore thermal effects described in conjunction with the F.M. system are greatly reduced.

Because of the large slip factor at which the motor is run in the A.M. system, there is no tendency for the motor to operate eccentrically due to electrical causes. Even if the three phase signals supplied to the motor from the power amplifiers are not symmetrical, the motor will still not shift its axis of rotation but tend to rotate smoothly on its axis. The above description of prior art systems shows some of the advantages of the A.M. system over the frequency modulated and/or phase modulated system.

For color operation, where it is desirable to record and then playback a color program an important feature would be to allow the tape unit to be synchronized to the horizon framing pulses only. This is so because vertical framing or vertical lock is not a requirement for color operation as the color processing circuits do not need vertical information for proper operation. This mode of locking or synchronizing a recorder or playback unit to horizontal signals will be referred to as the Line Lock mode, which means locking from a television line to a television line or line-by-line synchronization causing the headwheel motor to phase according to horizontal information. In the Line Lock mode, a requirement is that tight control of horizontal jitter be maintained which means a wide bandwidth servo using horizontal rate sampling. Such a mode should afford two advantages namely the low jitter requirement and the ability to recover rapidly from a system perturbation due to a disruption of signal caused by a bad splice, or if the headwheel is badly disturbed, or if there is a loss of sync, and so on. However, there are associated problems and disadvantages using the prior art A.M. system in such a mode of operation. In the F.M. system and/or a phase modulated system, if synchronization is lost in a Line Lock mode or there is a system perturbation, or disruption of signal due to a bad splice, or if the headwheel is badly distrubed, the oscillator which supplies signals to the 3-phase motor still has a natural free running frequency and it will tend to bring the headwheel motor back to the desired speed such that phase lock can be reestablished when the system perturbation subsides. However, in the A.M. system, if it is in a Line Lock or a horizontal lock mode where the system is synchronized by comparing a signal from the tape known as tape horizontal against the reference horizontal and either signal is lost due to a perturbation as above, a large heterodyne component will be developed at the headwheel modulator and will cause the headwheel to run away. The action of the heterodyne signal turns the headwheel modulator which drives the motor on and off alternately causing the motor to increase speed and then slow down and so on. This process can continue in such a fashion in the Line Lock or horizontal only mode such that the system cannot recover.

Accordingly, it is an object of the present invention to provide an improved amplitude modulated motor control system.

Another object is to provide an improved servo loop in an amplitude modulated motor control system to maintain precision phase control.

A further object is to provide an improved servo loop to afford low jitter operation in an amplitude modulated motor control system.

Still a further object is to provide an improved servo loop to afford improved stability in a recorder operating in a horizontal lock mode.

Another object is to provide an improved large bandwidth servo loop for an amplitude modulated motor control system.

Still another object is to provide a quick recovery horizontal lock mode in an amplitude modulated controlled servo system.

In one embodiment of the invention adapted for use in a compatible television recorder and reproducer, the Line Lock or horizontal lock more or phase control by horizontal sync is accomplished as follows.

The horizontal signals namely reference horizontal which is a signal from an accurate timing generator and tape horizontal which is the horizontal framing pulses reproduced from the television tape are compared by a phase comparator and the output error voltage is used to control the headwheel motor via a tone wheel servo. During this mode the complete tone wheel servo system remains in and is not removed as in the prior art. Horizontal phasing of the headwheel is accomplished through the tone wheel servo by causing the above output error voltage to control a variable delay generator in the ton wheel servo's reference path. Now in order to obtain a greater bandwidth and hence reduce system jitter, the output of the phase detector is differentiated. Thus a signal is produced which is proportional to the rate of change of phase and hence velocity. The output of the differentiator is fed directly into the headwheel modulator and further controls the headwheel motor and thus completely bypasses the low bandwidth servo. Now if the tape horizontal information, due to a system perturbation or a bad splice, is lost the tone wheel servo system is still present and acts in a manner to quickly stabilize the headwheel such that the horizontal phase comparator can regain control. The system is stabilized by the action of the tone wheel servo and upon the cessation of the system perturbation will continue to function in the Line Lock mode without causing the headwheel to run away. Consequently, the system has all the advantages previously described for an amplitude modulated system plus the further advantage, namely, the ability to keep the headwheel motor at substantially proper speed and phase at all times. If there is a system perturbation of any magnitude due to a loss of tape horizontal or otherwise the invention still allows the system to lock up immediately to the next horizontal line.

This invention will now be described in greater detail in connection with the accompanying drawing in which the single figure is a block diagram of one embodiment of the invention.

A magnetic tape 10 upon which a television signal has been recorded using a transverse scan technique is shown. A detailed description of television recording and reproducing apparatus using a transverse scan technique may be found in the literature. For example, reference is made to a book entitled "Video Tape Recording" by Julian Bernstein, 1960 Rider Publisher Inc., New York. The apparatus used to recover the television signal is the converse of that used to record the signal. The television signal may be reproduced by the same apparatus which recorded the signal on the tape or a different apparatus using the same techniques may be used.

The tape 10 can be driven at desired speeds by techniques known in the art such as a capstan motor and servo system, not shown. The tape 10 may be arranged in an endless loop or suitable supply and takeup reels (not shown) may be provided. Also the tape 10 may be taken from and returned to storage bins. A headwheel motor 15 causes a headwheel 16 to rotate at a suitable speed (for American Television Standards 14,400 revolutions per minute) in a plane perpendicular to the direction of movement of the tape 10. The headwheel 16 has four magnetic heads as 17 spaced 90° apart about the periphery thereof. Suitable guide mechanisms not shown serve to guide the tape 10 past the headwheel 16 so that the magnetic heads 17 can engate the tape 10 in turn. The heads 17 thereby scan in time sequence across the width of the tape. The signals and timing information reproduced from the transverse tracks on the tape 10 by the heads 17 are fed via slip rings or a rotating transformer (not shown) and lead 20 to video playback circuits 21. A detailed description of such playback circuits 21 may also be found in the above cited book.

The headwheel motor 15 also causes a tone wheel 22 to rotate. The tone wheel 22 may be constructed of magnetically susceptible material with a notch or aperture cut therein. Each time the notch passes a pickup device 23, a pulse is generated. In this or similar manner, a single pulse is generated for each complete revolution of the headwheel 16. The tone wheel 22 is designed by positioning the notch on the tone wheel 22 with respect to the position of the heads 17 on the headwheel 16 so that the pulse produced each revolution indicates when a particular one of the heads 17 is at the center of its scan across the tape 10.

The recorded information on the tape 10 contains video, timing and control signals. The exact nature of the information on such tracks is described in more detail in the above referenced book. A so-called tone wheel servo system 30 is shown in the drawing as enclosed by dashed lines.

For a clearer representation of the system operation, assume that it is desired to operate the recorder in the playback mode and it is further desired to playback a recorded color television signal. The recorder is activated by proper means not shown applying power thereto. It is further understood that proper ground and common returns not shown are provided between the circuits and systems represented by the blocks in the drawing in a manner understood in the art. The headwheel motor 15 is not rotating. A headwheel velocity control 24 included in the tone wheel servo 30 senses that the headwheel 15 is motionless and causes full power to be applied to the headwheel modulator 25 via adders 26 and 27. The adders 26 and 27 may be resistive networks or amplifiers with suming networks at their inputs. As the headwheel motor 15 starts to rotate the headwheel 16 and tone wheel 22, a pulse is produced on lead 31 once per revolution due to the action of the tone wheel 22 and pickup device 23 as described previously. This pulse is coupled to a tone wheel pulse shaper 28, whose function is to amplify and limit the signal on lead 31 into a clean useable signal. The output of the tone wheel pulse generator 28 is fed into a Velocity Time Constant Multivibrator 40 or as shown in the diagram a Velocity T. C. Multi. The Velocity T. C. Multi 40 is coupled to another Velocity T. C. Multi 41. The period of these multivibrators is adjusted by means of a potentiometer 46, or some other suitable device, to be equal to the time required for a complete revolution of headwheel 15 when operating at the desired speed. The output of the Velocity T. C. Multi 41 is fed to one input of the velocity error detector 24.

The multivibrators 40 and 41 may be monostable and hence produce a fixed delay for each pulse eminating from the pickup 23 and shaped through the pulse generator 28; or they can be astable and synchronized by the pulses from the pickup device 23. Numeral 42 refers to a velocity trapezoid generator which shapes the output of Velocity T. C. Multi 41 into a trapezoid signal used as the other input to the velocity error detector 24. Hince the velocity error detector 24 compares the tone wheel pulse period, which is the same as the period eminating from the trapezoid generator 42 with the fixed period generated by the two Velocity T. C. Multi's 40 and 41, and the signal at the output of 24 causes the headwheel modulator 25 to apply the appropriate power to each of the three phases of the headwheel motor 15. There is also shown a phase trapezoid generator 44 and a phase error detector 45. The generator 44 is coupled to the output of the Velocity T. C. Multi 40 and hence produces a trapezoid signal of the same period as the tone wheel pulses on lead 31. The output of the trapezoid generator 44 is coupled to one input of the phase error detector 45. While the headwheel motor 15 is accelerating and hence reaching desired speed the phase error detector 45 has relatively little influence on the headwheel modulator 25 as the signal from the velocity error detector 24 dominates. This may be done by adjusting the relative gain of the velocity error detector 24 in comparison to the phase error detector 45, or by adjusting the gain of the adder 26 in response to the error signals from the velocity error detector 24 and the phase error detector 45.

As the headwheel motor 15 approaches the correct speed (nominally 240 revolutions per second for American T.V. Standards), the period of the tone wheel trapezoid pulses at the output of the trapezoid generator 42 approaches the total period of the Velocity T. C. Multi's 40 and 41, and the output of the tone wheel velocity error detector 24 approaches a value where the detector 24 will no longer have complete control of the headwheel 15 via the headwheel modulator 25. At this point the velocity circuits as 28, 40, 41, 42 and 24 have brought the motor 15 up to speed and the system is now within the pull-in range of the tone wheel phase loop consisting of the phase trapezoid generator 44 and the tone wheel phase error detector 45. Hence the tone wheel phase detector 45 now has control of the motor 15 and causes the headwheel 16 and tone wheel 22 to phase in such a manner that the tone wheel pulses on lead 31 become phase locked to the tone wheel servo 30's input phase reference. The input phase reference is shown in the drawing as a reference vertical signal supplied from a suitable local source not shown and fed to the input of a variable delay generator 50 whose output is coupled to the other input of the tone wheel phase error detector 45. The reference vertical signal is supplied, for example, at a local station by means of a suitable sync generator as known in the art. Hence the tone wheel input phase reference is the reference vertical signal (60 Hz. for Amrican standards) delayed by the variable delay generator 50. The variable delay generator 50 is set for a nominal delay also corresponding to one revolution of the head wheel 16 when at proper speed, which in the case of a recorder operating on American TV. standards would be 4166 microseconds.

As the headwheel motor 15 reaches the above described phase locked condition, another phase comparator or sampler 60 compares the reference vertical signal from the local sync generator with tape vertical and develops an error signal which modulates the delay of variable delay generator 50 in such a manner as to cause tape vertical to become phase locked with reference vertical. The tape vertical signal, as its name implies, is derived from timing information on the tape 10 and is processed by the video circuits 21 and separated by the sync separator 29. The tape vertical signal is then coupled to the other input of phase comparator 60, to enable the above described error signal to be generated. The output of phase comparator 60 is shown going to one side of contact 61 of a switch or relay, the common side of the switch or contact going to the delay control input lead 62 of the variable delay generator 50. The delay of the variable delay generator 50 can be modulated by means of the voltage applied on the control input lead 62 to delay the sixty cycle field pulses or reference vertical a sufficient amount to cause the sixty cycle field pulse from the tape, or tape vertical, to be aligned with the reference vertical signal even under extreme or adverse conditions (i.e. phase differences between the two signals of ±200 microseconds).

When the tape vertical is properly aligned to the reference vertical, a vertical coincidence gate 64 senses the alignment and operates a relay 65, or some other suitable control device, switching the delay input control lead 62 of the variable delay generator 5 to a signal which is proportional to the phase error between the reference horizontal and tape horizontal signals. The contact of relay 65 is now in the dotted line position and lead 62 goes to the output of the Line Lock phase stabilizing network 66. The vertical coincidence gate 64 also smoothly turns on the horizontal rate sawtooth generator 67 when vertical lock is achieved. The turning on of the horizontal rate sawtooth generator 67 activates one input of the horizontal comparator 68. The other input of the horizontal comparator 68 is from the horizontal rate sample pulse generator 69 which produces a clean pulse in response to tape horizontal supplied from timing information on the tape 10 by means of the video circuits 21 and the sync separator 29. At this instant, the phasing of the headwheel motor 15 is controlled by the phase comparison of reference horizontal and tape horizontal.

The servo system described thus far is inherently a low bandwidth system, since the tone wheel servo 30, is itself a low bandwidth servo and all information is processed through it including the added horizontal phase information. In order to achieve the much wider potential bandwidth due to horizontal rate sampling, an additional control loop is coupled to the headwheel modulator 25. The output of the horizontal comparator 68 is differentiated by means of a capacitor 70 and a resistor 71. One terminal of capacitor 70 is coupled to the output of the comparator 68 and the other terminal is coupled to one terminal of a resistor 71, whose other end is brought to a point of reference potential or ground. The common point of resistor 71 and capacitor 70 is coupled to the Line Lock stabilizing network 73, which may be a direct current amplifier with suitable compensating network and of suitable gain. There is also shown a gain control 74 coupled to the Line Lock velocity stabilizing network 73 to set the network 73 for optimum level. The output of network 73 goes to an adder circuit 27, which serves to couple the signal from network 73 to the headwheel modulator 25 as described before. The output of the differentiator 72 comprises capacitor 70 and resistor 71 is proportional to the rate of change of the error at the output of the horizontal comparator 68 and hence is proportional to velocity, therefore 72 is referred to in the figure as a velocitizer. Thus 72 supplies full bandwidth horizontal lock velocity information directly to the headwheel modulator 25, while horizontal lock phase information is supplied through the tone wheel servo 30, by taking the output of the comparator 68 and applying it to an amplifier 66, referred to as Line Lock phase stabilizing network, and using the output of network 66 to directly control the delay of the variable delay generator 50 which is in the tone wheel servo phase reference path.

The operation described above allows vertical synchronization to occur and then there is an automatic switch over via relay 65 to horizontal synchronization and then horizontal locking occurs as described. Where there is full horizontal and vertical synchronization desired the vertical coincidence gate 64 is always active. Should there be any disturbances to the headwheel motor 15, which momentarily causes the vertical coincidence gate 64 to unlock, the relay 65 will switch back into position 61 reconnecting vertical phase comparator 60 to the variable delay generator 50 and disabling the horizontal comparator 68 by turning off the horizontal rate sawtooth generator 67. Then the whole reframing cycle is initiated sequentially as vertical sync, switchover horizontal sync and so on. This reframing operation can take several seconds.

Shown connected to one side of relay 65 is a switch 80 labelled Line Lock. When switch 80 is operated it activates relay 65 and causes the delay control input lead 62 of the variable delay generator 50 to be under control of the horizontal comparator 68 as described before while further inactivating the vertical coincidence gate 64. From this point on whether or not there is vertical sync the servo will stay in the Line Lock mode. If tape signals are temporarily disrupted or there is a headwheel disturbance due to a bad tape splice or otherwise the headwheel 15 will lock on the nearest horizontal line and will not reframe vertically thus speeding recovery.

The results achieved due to the compound servoing of the tone wheel servo 30 and the Line Lock loops provides the desired stable low jitter operation for color playback and also provides quick recovery from system disruptions. Error signals from the compound system are appropriately added in adder 27 so that during such disturbances where the headwheel 16 is momentarily unlocked, the tone wheel servo error from adder 26 predominates thus keeping the headwheel 16 speed close to the correct value. When the system perturbation subsides the Line Lock circuitry via the horizontal comparator 68 regains control of the headwheel 16. Thus in this Line Lock mode the tone wheel servo 30 is ever ready to establish quick headwheel recovery no matter how massive the system disturbance.

What is claimed is:

1. A servo system for use in a reproducing apparatus having a moveable member for scanning a record upon which at least a repetitive control signal is recorded wherein said apparatus includes means for reproducing said control signal and for producing a second control signal indicative of the velocity and phase of said member, said servo system comprising, means for comparing said second control signal and a reference signal as to frequency and phase and for controlling the velocity and phase of said member in response to the error signal produced by said comparing means, means for comparing said first control signal and a second reference signal of the same frequency as said first control signal to produce a second error signal determined by the phase difference between said first control signal and said second reference signal, and means for altering the timing of said first reference signal as applied to said first comparing means in response to said second error signal so that said member is controlled in phase and velocity concurrently by both said first and second error signals.

2. A servo system for use in an apparatus having a moveable member for reproducing a television signal having horizontal and vertical synchronizing components recorded on a record medium wherein said apparatus includes means for producing a first control signal corresponding to said horizontal components and a second control signal indicative of the velocity and phase of said member, said servo system comprising, means for comparing said second control signal and a reference vertical sync signal of a frequency equal to that of said vertical synchronizing component and for controlling the velocity and phase of said member in response to the error signal produced by said comparing means, means for comparing said first control signal and a reference horizontal sync signal of the same frequency as said first control signal to produce a second error signal determined by the phase difference between said first control signal and said reference horizontal sync signal, means for altering the timing of said reference vertical sync signal as applied to said first comparing means in response to said second error signal so that said member is controlled in phase and velocity concurrently by both said first and second error signals.

3. A servo system for use in a reproducing apparatus having a moveable member for scanning a record upon which at least a repetitive control signal is recorded wherein said apparatus includes means for reproducing said control signal and for producing a second control signal indicative of the velocity and phase of said member, said servo system comprising, means for comparing said second control signal and a reference signal of a frequency lower than that of said second signal and for controlling the velocity and phase of said member in response to the error signal produced by said comparing means, means for comparing said first control signal and a second reference signal of the same frequency as said first control signal to produce a second error signal determined by the phase difference between said first control signal and said second reference signal, means for altering the timing of said first reference signal as applied to said first comparing means in response to said second error signal so that said member is controlled in phase and velocity concurrently by both said first and second error signals, means coupled between said second comparing means and said member for controlling said member according to the rate of change of said second error signal to minimize said second error signal.

4. A servo system for use in an apparatus having a movable member for reproducing a television signal having horizontal and vertical synchronizing components recorded on a record medium wherein said apparatus includes means for producing a first control signal corresponding to said horizontal components and a second control signal indicative of the velocity and phase of said member, said servo system comprising, means for comparing said second control signal and a reference vertical sync signal of a frequency equal to that of said vertical synchronizing component and for controlling the velocity and phase of said member in response to the error signal produced by said comparing means, means for comparing said first control signal and a reference horizontal sync signal of the same frequency as said first control signal to produce a second error signal determined by the phase difference between said first control signal and said reference horizontal sync signal, means for altering the timing of said reference vertical sync signal as applied to said first comparing means in response to said second error signal so that said member is controlled in phase and velocity concurrently by both said first and second error signals, differentiating means coupled between said second comparing means and said member for controlling said member according to the rate of change of said second error signal, whereby said member is controlled as to velocity and phase to minimize said second error signal.

5. A servo system as claimed in claim 4, and wherein said apparatus is a transverse scan magnetic tape reproducer including a headwheel as said movable member driven by an amplitude modulated motor control system to scan successively record tracks recorded transversely across a magnetic tape, and means for adding said first error signal and the output of said differentiating means and for applying the resulting signal to said motor control system in a manner to control the velocity and phase of said headwheel.

6. Apparatus for a television playback recorder for synchronizing a television signal recorded on a medium, said signal containing synchronization information, to a first reference signal by means of a second reference signal comprising in combination,
- a rotatable assembly carrying a plurality of magnetic heads operative to reproduce said television signal from said medium,
- means including a motor for driving said assembly,
- means coupled to said magnetic heads and responsive to said television signal for producing a pulse train containing said synchronization information,
- first comparing means responsive to said pulse train and said first reference signal to produce an error signal proportional to the phase error therebetween,
- a variable delay coupled to said comparing means and responsive to said error signal and said second reference signal to change the timing of said second reference signal in accordance with said error signal,
- control means having relatively low bandwidth coupled to said first means said control means including second comparing means coupled to said variable and responsive to said change in timing of said second reference signal for determining velocity and phase of said motor and therefore said rotatable assembly according to said change in timing of said second reference signal,
- a differentiator circuit coupled to said control means and said first comparing means for producing a signal proportional to the rate of change of said error voltage, the action of said signal substantially broadening the bandwidth of said control means.

7. A servo system for use in a transverse scan reproducing apparatus having a multiple magnetic head headwheel member for scanning a magnetic tape upon which a television signal including vertical and horizontal synchronizing components is recorded along parallel tracks transverse of said tape, wherein said apparatus includes means for reproducing said vertical and horizontal components and a motor drive control assembly for producing while driving said member a control signal indicative of the velocity and phase of said member, said servo system comprising,
- a variable delay means,
- control means connected to said assembly said control means including comparing means responsive to said control signal and to a local reference vertical sync signal applied to said comparing means through said delay means for determining the velocity and phase of said member,
- a phase camparator responsive to said local reference vertical sync signal and to said reproduced vertical component to produce a first error signal determined by the phase error therebetween,
- switching means,
- means for applying said error signal to said delay means through said switching means to cause said delay means to change the timing of said local reference vertical sync signal as applied to said control means in accordance with said error signal to minimize said error signal,
- a second phase comparator responsive to a local reference horizontal sync signal and to said reproduced horizontal component to produce a second error signal determined by the phase error therebetween,
- means for applying said error signal to said switching means,
- means connected to said switching means for determining the coincidence between said local reference vertical sync signal and said reproduced vertical component and upon the occurrence of a coincident condition therebetween for operating said switching means to apply said second error signal to said delay means in place of said first error signal,
- said delay means being responsive to said second error signal to change the timing of said local reference vertical sync signal as applied to said control means to minimize said second error signal.

8. A servo system as claimed in claim 7, and comprising,
- a differentiating circuit connected to said second comparator and responsive to said second error signal to produce an output signal determined by the rate of change of said second error signal, and
- means for applying said output signal to said assembly to cause said assembly to control the velocity and phase of said member to further minimize said second error signal.

References Cited
UNITED STATES PATENTS
| | | | |
|---|---|---|---|
| 3,017,462 | 1/1962 | Clark et al. | 178—6.6 |
| 3,206,549 | 9/1965 | Bahring | 178—6.6 |

RICHARD MURRAY, Primary Examiner

B. LEIBOWITZ, Assistant Examiner

UNITED STATES PATENT OFFICE
CERTIFICATE OF CORRECTION

Patent No. 3,542,950          Dated Nov. 24, 1970

Inventor(s)   Arch C. Luther, Jr. and Robert G. Breed

It is certified that error appears in the above-identified paten and that said Letters Patent are hereby corrected as shown below:

Column 2, line 62 "distrubed" should be --disturbed--
Column 3, line 29 "more" should be --mode--
Column 3, line 41 "ton" should be --tone--
Column 4, line 36 "produced each" should be --produced onc each--
Column 5, line 7 "Hince" should be --Hence--
Column 5, line 40 "velocity circuits" should be --velocity control circuits--
Column 5, line 44 "phase de-" should be --phase error de-
Column 6, line 18 "5" should be --50--
Column 9, line 26 "variable and" should be --variable dela
Column 10, line 19 "said error" should be --said second er Signed and sealed this 17th day of August 1971.

(SEAL)
Attest:

EDWARD M. FLETCHER, JR.                    WILLIAM E. SCHUYLER, JF
Attesting Officer                          Commissioner of Patents

FORM PO-1050 (10-69)